United States Patent
Thayer et al.

(10) Patent No.: US 11,226,674 B2
(45) Date of Patent: Jan. 18, 2022

(54) ENHANCED REALITY SYSTEM WITH HAPTIC RETARGETING

(71) Applicant: HEWLETT-PACKARD DEVELOPMENT COMPANY, L.P., Spring, TX (US)

(72) Inventors: Alexander Thayer, Palo Alto, CA (US); Ian N. Robinson, Palo Alto, CA (US); Hiroshi Horii, Palo Alto, CA (US); Junrui Yang, Palo Alto, CA (US); Rafael Ballagas, Palo Alto, CA (US); Ning Ge, Palo Alto, CA (US); Craig Peter Sayers, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/630,048

(22) PCT Filed: Sep. 25, 2017

(86) PCT No.: PCT/US2017/053175
§ 371 (c)(1),
(2) Date: Jan. 10, 2020

(87) PCT Pub. No.: WO2019/059938
PCT Pub. Date: Mar. 28, 2019

(65) Prior Publication Data
US 2020/0233484 A1      Jul. 23, 2020

(51) Int. Cl.
*G06F 3/01* (2006.01)
*G06F 3/03* (2006.01)
(Continued)

(52) U.S. Cl.
CPC .............. *G06F 3/011* (2013.01); *G06F 3/016* (2013.01); *G06F 3/0346* (2013.01); *G06T 7/74* (2017.01); *G06T 19/006* (2013.01)

(58) Field of Classification Search
None
See application file for complete search history.

(56) References Cited

U.S. PATENT DOCUMENTS

2004/0233223 A1* 11/2004 Schkolne .............. G06F 3/0346
                                                                345/621
2013/0300637 A1   11/2013 Smits et al.
(Continued)

OTHER PUBLICATIONS

Ban, Yuki, et al; "Air Haptics: Displaying Feeling of Contact with AR Object Using Visuo-Haptic Interaction"; Siggraph 2015; Xroads of Discovery; Conference Aug. 9-13, 2015.
(Continued)

*Primary Examiner* — Tapas Mazumder
(74) *Attorney, Agent, or Firm* — Fabian VanCott

(57) ABSTRACT

An enhanced reality system, in an example, includes an input device, the input device including a first arm and a second arm configured to be held together by a user; a sensor to sense, at least, a relative position of at least a portion of the first and second arms; wherein sensing, at least, the relative position of the first and second arms comprises a haptic retargeting process that simulates a touching of ends of the first and second arms to the outer surface of a virtual object presented in the enhanced reality environment.

19 Claims, 8 Drawing Sheets

(51) Int. Cl.
    *G06T 7/73*     (2017.01)
    *G06F 3/0346*     (2013.01)
    *G06T 19/00*     (2011.01)

(56) References Cited

U.S. PATENT DOCUMENTS

| | | |
|---|---|---|
| 2016/0140763 A1 | 5/2016 | Seichter et al. |
| 2016/0274662 A1 | 9/2016 | Rimon et al. |
| 2016/0363997 A1* | 12/2016 | Black ................. G06F 3/016 |
| 2017/0168576 A1 | 6/2017 | Keller et al. |
| 2017/0177191 A1* | 6/2017 | Lightcap ............. G09B 23/28 |
| 2018/0173310 A1* | 6/2018 | Geis ................... G06F 3/016 |

OTHER PUBLICATIONS

Chinthammit, W. et al., "Ghostman: Augmented Reality Application for Tele Rehabilitation and Remote Instruction of a Novel Motor Skill" (Apr. 15, 2014) < https://www.hindawi.com/journals/bmri/2014/646347/ >.

Kitamura, Yoshifumi, et al. "Object Deformation and Force Feedback for Virtual Chopsticks" (Nov. 2005) Osaka University, Human Interface Engineering Lab: 211-219.

Kitamura, Yoshifumi, et al. "Virtual Chopsticks: Object Manipulation Using Multiple Exact Interactions" IEEE Virtual Reality, Houston USA (Mar. 13-17, 1999): 198-204.

\* cited by examiner

ENHANCED REALITY SYSTEM WITH HAPTIC RETARGETING

BACKGROUND

Augmented reality, virtual reality, and mixed reality all involve users interacting with tools in order to manipulate virtual objects presented to the users via a visual output device. The virtual objects presented in the virtual environment may be manipulated by a user in real-time creating the illusion of manipulation of a real object.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
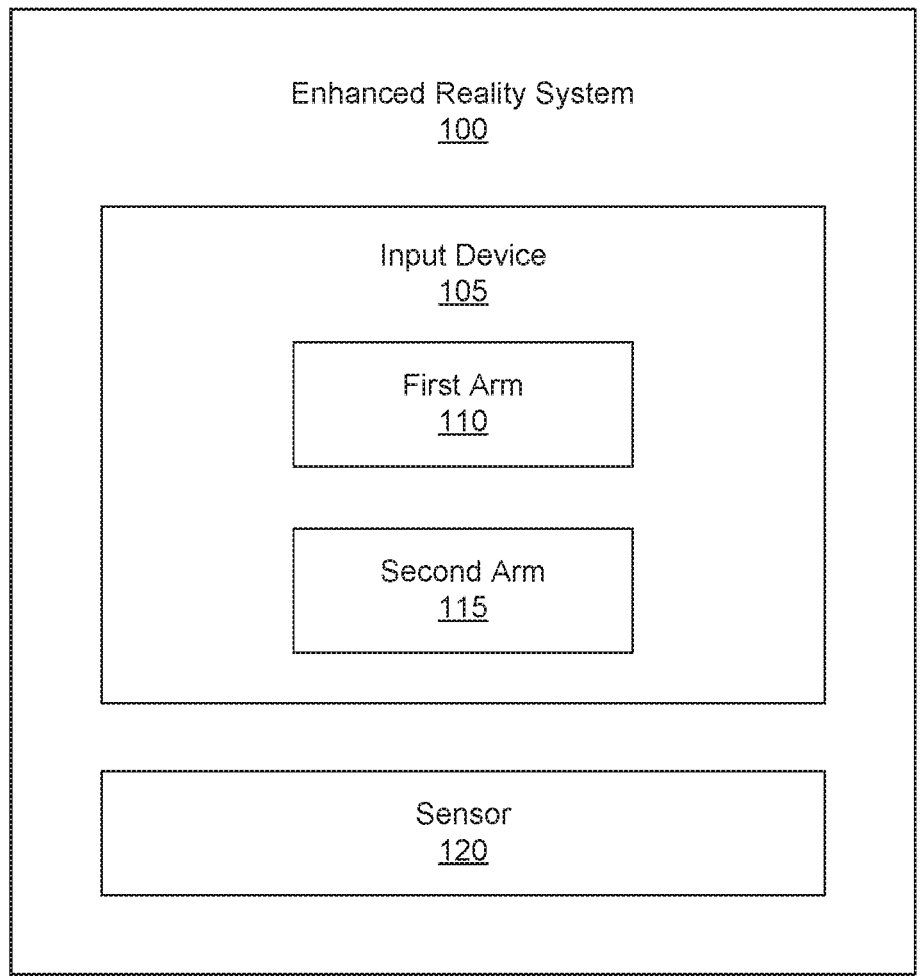
FIG. 1 is a block diagram of an enhanced reality system according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Virtual reality, augmented reality, and mixed reality systems and devices are used to manipulate virtual objects presented visually to a user via an output device. Virtual reality systems and devices are systems and devices that use virtual reality (VR) headsets to generate realistic images, sounds, and other human discernable sensations that simulate a user's physical presence in a virtual environment presented in the headset. In some examples, the VR system and/or device includes physical spaces and/or multi-projected environments. Augmented reality systems and devices may include those systems and devices that implement live direct and/or indirect view of a physical, real-world environment whose elements are augmented by computer-generated sensory input such as sound, video, graphics and/or GPS data. Mixed reality systems and devices include the merging of real and virtual worlds to produce new environments and visualizations where physical and digital objects co-exist and interact in real time. For simplicity in description only, a virtual reality (VR), augmented reality (AR), and mixed reality (MR) systems and devices are referred to as an enhanced reality (ER) systems and/or devices.

These ER systems and devices often include physical input devices used by a user to interact with the enhanced reality environment. In the examples presented herein, the input device is a pair of elongated members. These elongated members, in an example, may be similarly shaped to that of a pair of chopsticks. For ease of description, these elongated members will be referred to as "chopsticks." These chopsticks described herein may provide the user with the ability to manipulate virtual objects represented to the user via the ER systems and devices. Although the present specification describes the elongated members as chopsticks, other forms of elongated members may exist including, for example, a pair of tweezers, pliers, and tongs, among others.

Control of virtual objects in the ER environment using tools has generally implemented active force feedback in order to provide to a user a feeling of realism. However, such implementation is costly and relatively complex to implement.

The present specification describes an enhanced reality system that includes, in an example, an input device, the input device comprising a first arm and a second arm to be held together by a user, a tracking system to track, at least, a three-dimensional (3D) position of the first and second arms, wherein sensing, at least, the relative position of the first and second arms comprises a haptic retargeting process that simulates a touching of ends of the first and second arms to the outer surface of a virtual object presented in the enhanced reality environment. A user of the enhanced reality system thus has the physical sensation of a real object between the arms even though, in an example, are just touching one arm against the other in the real world. In various examples, a convergence rate of a virtual representation of the first arm and a virtual representation of the second arm represented in the enhanced virtual environment is relatively slower than a convergence rate of the physical first arm and second arm, respectively, during the retargeting process.

The present specification further describes an input device that includes, in an example, a first arm, a second arm, a tracking system to detect the position, within a physical 3D space, each of the first arm and second arm, and a haptic retargeting module to adjust the spacing between the virtual first and virtual second arms displayed in an enhanced reality environment, such that haptic feedback provided to a user by the first and second arms touching one another translates into virtual touching of the ends of the virtual first arm and virtual second arm to a first surface point and second surface point, respectively, on a virtual object represented in the enhanced virtual environment.

The present specification also describes a computer program product for mapping physical 3D space with virtual 3D space, the computer program product that includes, in an example, a computer readable storage medium comprising computer usable program code embodied therewith, the computer usable program code to, when executed by a processor: receive input describing the physical 3D position of a first arm and a second arm; receive input describing a virtual object to be manipulated; conduct a retargeting process that simulates the touching of an outer surface of a virtual object represented in an enhanced virtual environment when ends of the first arm and second arm touch.

As used in the present specification and in the appended claims, the term "haptic" is meant to be understood as any form of interaction with a device that, through touching the device, output is felt by the user.

Also, as used in the present specification and in the appended claims, the term "virtual object" is meant to be understood as an object represented within an enhanced reality environment and viewable by a user of an enhanced reality system, but which has no physical counterpart in the physical world.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may or may not be included in other examples.

Turning now to the figures, FIG. 1 is a block diagram of an enhanced reality system (100) according to an example of the principles described herein. The enhanced reality system (100) includes an input device (105) and a sensor (120).

The input device (105) includes a first arm (110) and a second arm (115). The first arm (110) and second arm (115) may both be elongated members. These elongated members, in an example, may be similarly shaped to that of a pair of chopsticks. Accordingly, in this example, the first arm (110) and second arm (115) may be held by a user similarly to how a user would hold a pair of chopsticks. Additional structural features may be coupled or formed into the first arm (110) and/or second arm (115) to support the operation thereof. These additional structure features will be described in more detail herein.

In an example, the input device (105) may be virtually represented in the virtual environment. In an example, the shape and features of the input device (105) may be identically represented the virtual world. In an example, the virtual representation of the input device (105) in the virtual world may not be identically represented. As an example, the input device (105) may include generally a first arm (110) and a second arm (115) but may be represented in the virtual environment as a pair of chopsticks, tweezers, pliers, or any other similar type of device having a first arm (110) and a second arm (115). In this example, a user may select, via graphical user interface, the type of device represented virtually in the virtual environment regardless of the actual real-world appearance of the input device (105).

The sensor (120) may include any device or combination of devices that can provide information regarding the relative position of the first arm (110) to the second arm (115). In an example, the sensor (120) senses the relative position of, at least, the distal ends of the first arm (110) relative to the second arm (115). In an example, the sensor (120) may further be capable of tracking the real-world three-dimensional (3D) position and/or orientation of the first arm (110) and/or second arm (115). Although some example sensors (120) described herein may detect the absolute 3D position and orientation of the first arm (110) and/or the second arm (115), in some examples the sensor (120) output may include the relative position and orientation of the first arm (110) to the second arm (115).

Additionally, in any example sensor (120) described herein that can detect the relative position of the distal ends of first arm (110) and the second arm (115), the sensor (120) may be placed on one of the first arm (110) or the second arm (115) or on both the first and second arms (110, 115), or external to both the first and second arms (110,115). Thus, the present specification contemplates the use of multiple devices places at multiple or single locations relative to or on any of the first and second arms (110, 115).

According to the present description, any example sensor (120) or element of an example sensor (120) may be combined with any other example sensor (120) or element of an example sensor (120) in order to, at least, determine a relative position of at least a portion of the first arm (110) relative to the second arm (115).

In an example, the sensor (120) may include an external camera to detect the 3D position and orientation of the first arm (110) and/or the second arm (115). To assist the detection of the first arm (110) and/or second arm (115) by the camera, the first arm (110) and/or second arm (115) may further include trackable indicators thereon. Examples of trackable indicators placed on and/or in the first arm (110) and/or the second arm (115) may include reflective tape, colored paints, and light-emitting diodes (LEDs), among others. In this example, the camera may be communicatively coupled to a processor that executes computer readable program code that analyzes the images provided by the camera and determines a 3D position and orientation of the first arm (110) and/or second arm (115).

The camera may also measure the position and/or orientation of a user's hand holding the input device (105). Such a measurement may be used along or in combination of other sensors (120) described herein to infer a position and/or orientation of the first and second arms (110, 115).

The camera may also measure the position and/or orientation of one of the first and second arms (110, 115). This measurement may be used to infer the position of the other of the first and second arms (110, 115) using one or more of the sensors (120) described herein.

The tracking of the 3D position of the first and second arms (110, 115) within the real-world provides information to the enhanced reality system (100). This information includes the absolute position and/or orientation of the first and second arms (110, 115) among other 3D-related information. This information is provided to the enhanced reality system (100) in order to show the position of the first and second arms (110, 115) in a virtual environment. Tracking of the first and second arms (110, 115) may be accomplished through the use of any one or a combination of the sensors (120) described herein.

In an example, the sensor (120) may include a strain gauge. The strain gauge may be included in the first arm (110) and/or the second arm (115). In this example, the strain gauge may detect the bending forces places on at least one of the first arm (110) and/or second arm (115). The bending forces placed on either the first arm (110) and the second arm (115) may indicate to a processor an applied grip pressure presented by the user on the first arm (110) and/or second arm (115). This grip pressure may be transmitted wirelessly to the processor, for example via Bluetooth, or it may be transmitted visually, for example via an LED display on one of the arms which is visible to the camera. The grip pressure may indicate to the processor how a represented virtual object is to deform, if at all, based on the deformation of the first arm (110) and/or second arm (115) as measured by the strain gauge.

In an example, the sensor (120) may directly measure the distance between the distal ends of the two arms (110,115). The sensor (120) may be a camera on one arm viewing fiduciary marks on the other arm, or a Hall effect sensor on one arm measuring proximity to a magnet on the other arm, or a light and light sensor on one arm measuring the light reflected from the second arm. The sensor may be communicatively coupled to the processor. The processor may receive the signals provided by the sensor in order to, at least, determine the relative proximity of at least a portion of one of the first arm (110) and/or second arm (115) to the other of the arms (110, 115).

In an example, the sensor (120) may be powered by a battery placed within the shaft of either or both of the first arm (110) and the second arm (115). The battery may provide power to any of the devices and/or sensors (120) placed within or on the first arm (110) and/or second arm (115). In any example, therefore, where power may be used by the devices associated with the first arm (110) and/or second arm (115), the batteries may provide such power. These batteries may be replaceable and/or rechargeable.

In an example, the sensor (120) may include a coupleable, enhanced reality (ER) system-specific, tracking device selectively coupleable to the first arm (110) and/or second arm (115). In this example, the coupleable tracking device may include its own sensors, similar to those used to track the positions of other components in the ER system (e.g. hand controllers), that can detect the 3D position of the first arm (110) and/or the second arm (115). An electrical interface between the coupleable tracking device and the first arm (110) and/or second arm (115) may be provided such that the coupleable tracking device may receive information concerning the relative position of the first arm (110) and/or second arm (115) to the coupleable tracking device. The coupleable tracking device may combine this information with its own sensor data and send, wirelessly or by wire, information to the processor indicating the relative position of the first arm (110) to the second arm (115) and/or the 3D position of the first arm (110) and/or second arm (115). The electrical interface coupling the coupleable tracking device to the first arm (110) and/or second arm (115) may provide additional information to the coupleable tracking device originating from the sensors coupled to the first arm (110) and/or second arm (115). As an example, the Hall effect sensors and/or strain gauge may provide their respective signals to the coupleable tracking device via the electrical interface. The coupleable tracking device, in an example, may include a processor to process any data received from the first arm (110) and/or second arm (115) and communicate that information to another processor associated with the display of an enhanced reality system. In this manner, the physical orientation of, at least, the first arm (110) and/or second arm (115) may be translated into a virtual environment.

In an example, the first arm (110) may be physically connected to the second arm (115) using a tether. The tether may be coupled to the first arm (110) and second arm (115) so as to provide a degree of movement between the first and second arms (110, 115) commensurate with them being used in a manner similar to chopsticks, but keep the two arms (110, 115) connected. This may prevent the accidental loss of one or the pair of arms (110, 115), Additionally, the tether may provide a structural conduit through which an electrical connection can be passed. In this example, the electrical line may allow individual sensors or devices (i.e., the battery) to be communicatively and/or electrically coupled together.

In an example, the proximal ends of the first arm (110) and second arm (115) may be structurally coupled together so as to be allowed to move relative to each other in a single plane. In an example, the structural coupling may be accomplished using a hinging system that allows for movement of the distal ends of the first arm (110) and second arm (115) to be brought together. In this example, sensor (120) may be a potentiometer, optical encoder, camera, compression sensor, Hall effect sensor, or rotational position encoder added to a hinge coupled between the first arm (110) and second arm (115) in order to determine an opening angle created between the first arm (110) and second arm (115) of the input device (105), Determining the opening angle created between the first arm (110) and second arm (115) provides information regarding the position of the first arm (110) relative to the second arm (115). In an example, a spring may also be added that maintains the input device (105) in an open position (i.e., distal ends of the first arm (110) and second arms (115) the furthest away from each other) so as to implement user force against at least one of the first arm (110) and second arms (115) to close them. In an example, the strain gauge, camera, or other sensor (120) described herein may also be used to determine the flexing distance and, accordingly, the force placed on a virtual object as well. In this example, an angle of the hinge may also indicate how much the first and second arms (110, 115) have been strained against each other. This information is translated into a force applied by the user on the input device (105) which may be used in the virtual world to indicate how hard the virtual object is being gripped or how much the virtual object is to be deformed.

In an example, the geometry of the first arm (110) and/or second arm (115) may by altered using a number of physical intervening stopping members that are coupled to one of the first arm (110) or second arm (115). The number of physical intervening stopping members may be fixed to a distal end of at least one of the first arm (110) or second arm (115). As the user interacts with a virtual object in a virtual environment, the number of physical intervening stopping members may be placed in between the first arm (110) and second arm (115) in order to simulate the grasping of the virtual object by the first arm (110) and second arm (115) by placing a stopping force between the first arm (110) and second arm (115). In an example, the number of physical intervening stopping members may be coupled to one of the first arm (110) and second arm (115) such that rotation about one of the first arm (110) and second arm (115) may selectively place at least one of the number of physical intervening stopping members in between the first arm (110) and second arm (115). In some examples, the length, compliance, and/or resilience of each of the number of physical intervening stopping members may be selected based on the type of virtual object selected by the user. As an example, a virtual object to be selected by the user has a relatively softer outer surface. In this example, the enhanced reality system (100) detects that a user is going to select that object and causes one of the number of physical intervening stopping members to be placed in a plane defining a point where the first arm (110) and second arms (115) are to touch together. The length of the selected physical intervening stopping member may be dependent on the size of the virtual object such that a user interfacing with the virtual object feels that contact has been accomplished as the selected interleaving stopping member prevents the first arm (110) and second arms (115) from touching. Any differences between the length of the stopping member and the actual size of the gripped virtual object can be accounted for using the haptic retargeting method.

In an example, the compliance of either the first arm (110) and/or second arm (115) may be altered to provide haptic feedback to the user to simulate holding a virtual object which is more or less compliant. In an example, the selected physical intervening stopping member may be relatively more or less compliant in order to provide haptic feedback to a user that the virtual object is relatively more or less compliant. In one example, compliance is supplied by using a compliant material such as rubber. In another example, a compliant material is simulated using magnets. In another example, a compliant material is simulated using electromagnets. In these examples, the user, via a physical device, is led to believe that the properties of the virtual object can actually be felt. This leads to a relatively better experience with the enhanced reality system (100).

The first arm (110) and/or second arms (115) provide haptic feedback to a user during use and in combination with the haptic retargeting process described herein. In some examples, the haptic feedback devices provide a real world feel that represents situations where, even with the use of the haptic retargeting process, gripping a virtual object with the input device may not feel as convincing to a user. In some examples, the geometry of at least one of the first arm (110) or second arm (115) may be altered using the haptic feedback devices described herein. In this example, the haptic retargeting process may still be used to simulate an arbitrarily sized virtual object within the enhanced virtual environment by accommodating for the physical space of the haptic feedback devices placed between the first arm (110) and second arm (115).

In an example, the weight of the distal ends of the arms (110,115) may be altered during operation of the input device (105). In this example, inflatable bags are coupled to the distal ends of at least one of the first arm (110) and second arm (115). The inflatable bags may be inflate using fluids such that the weight of a virtual object may be mimicked. As the first arm (110) and second arms (115) are used to lift a virtual objects, the inflatable bags may be filled with fluid to simulate the weight of the lifted object. The fluids may be provided to the inflatable bags via a reservoir fluidically coupled to the inflatable bags via a number of hoses. A weight or piston may be used to press the fluid through the hoses to the inflatable bags when the enhanced reality system (100) determines the virtual object the user is selecting to interact with.

Although example haptic feedback devices have been described herein, these haptic feedback devices are meant to be viewed as examples and not meant to limit the present disclosures. Instead, the present specification contemplates the use of many other haptic feedback devices to be used in connection with the first arm (110) and/or second arm (115). Other examples of haptic feedback devices may include vibration devices, odor providing devices, and heating and cooling devices, among others.

As described herein, the enhanced reality system (100) also includes a processor to receive input from the input device (105) and its associated sensors on or incorporated into the first arm (110) and/or second arm (115). The processor also executes computer readable program code to display a virtual environment to a user. The virtual environment may display to a user a number of virtual objects as described herein. The virtual environment may also display, via execution of computer readable program code, a virtual representation of the real-world input device (105) including its first arm (110) and second arm (115) or portions thereof. Any number of visual representations may be presented to the user to display the input device (105) and may include, in some examples, a one-, two-, three-, four, and/or zero-point perspective view. In an example, the visual representation is a 3-point perspective view. Thus, during operation of the enhanced reality system (100), the sensor (120) may translate the real-world 3D position of the input device (105) into a virtual 3D position in the virtual environment with any-point perspective view of the input device (105). This allows the user to see the virtual representation of the input device (105) accessing or manipulating a virtual object. Additionally, the manipulation of a virtual object and the translation of the represented input device (105) within the virtual environment may be done in real-time adding to the illusion that a user is actually manipulating a real-world object.

The processor or processors of the enhanced reality system (100) may further detect which, among a number of virtual objects, a user intends to interact with. As an example, the input device (105) may be used to indicate which virtual object is going to be interacted with by using a pointing feature based on the position real-world 3D position of the input device (105) and at least one of its first arm (110) and/or second arms (115). In an example, a number of threshold values may be implemented such that a virtual object is selected for interfacing with the virtually represented input device (105) when the 3D position of the input device (105) is within a threshold distance of the virtual object. In an example, a number of threshold values may be implemented such that a virtual object is selected for interfacing with the virtually represented input device (105) when the 3D position of the input device (105) is pointing towards a virtual object within a threshold distance. Other methods may be used to select the virtual object for manipulation and the present specification contemplates the use of those methods. For instance, any object intersected by a line drawn between the tips of the distal ends of the chopsticks may be selected. The system may include feedback to the user via a GUI that highlights, for example, any currently selected object.

The described haptic retargeting process or ungrounded haptic retargeting may focus on the force feedback while operating the input device (105). In order to provide the force feedback for the input device (105), two sources of force feedback may be identified: grounded and ungrounded.

Grounded force feedback means that the force feedback is grounded on an external object. For example, when a user uses the input device (105) to poke on a table, a counter force of the table provides force feedback on the input device (105). This kind of force feedback shares similar characteristics with tactile feedback on hands, so they both can be achieved by remapping the spatial location and using force provided by physical haptic devices as force feedback. In this example, any form of tactile feedback by haptic illusion in contemplated in the present specification and could be applied to provide grounded force feedback.

In an example, haptic illusion may be used to provide ungrounded force feedback. In the case of ungrounded force feedback, a counter-force comes from a force applied by another part of the same input device. The force feedback is not grounded on an external object, and is therefore called ungrounded.

The processor or processors of the enhanced reality system (100) may further initiate a haptic retargeting process or ungrounded haptic retargeting process. The haptic retargeting process retargets, in the virtual environment, the real-world 3D position of both the first arm (110) and second arm (115). With this implementation, retargeting both of the rotational angles of the first arm (110) and second arm (115) relative to, for example, the hinge makes both of the first arm (110) and second arms (115) touch the virtual object at the same time, and therefore, no grounded force, or the force being grounded to an external object, like the floor, is realized. This haptic retargeting process may also be realized without the hinge present in the input device (105).

The possible states envisioned for the first arm (110) and/or second arms (115) includes opened, closed, and holding a virtual object. While the first arm (110) and second arm (115) are opened or closed, both of the first arm (110) and second arm (115) may be at the same orientation in the virtual world as in the real world. When the first arm (110) and second arm (115) are holding the virtual object, the first arm (110) and second arm (115) are to be touching the surface of the closest (in terms of the sum of angular distance between two arms (110, 115) virtual object between the virtual first arm (110) and second arm (115). The opening angle is used to determine the process of the transition. When the input device (105) is in an opened state, the first arm (110) and second arms (115) should be fully opened. Accordingly, while the input device (105) is to be fully closed, the first arm (110) and second arm (115) is in a closed state or holding an object state.

With this information, computer readable program code may be executed to calculate the transfer state and render the virtual model of the input device (105) with its first arm (110) and second arm (115). A script may also be implemented to make the virtual object placed in between the virtual first arm (110) and second arm (115) move with the input device (105) once the input device (105) reaches the "holding an object" state. Additional script may be implemented to correctly calculate the release velocity of the virtual object when release velocity is captured by the, for example coupleable tracking device described herein. In an example, this may give the coupleable tracking device the ability to pick up and release virtual objects.

By leveraging the dominance of vision over haptic feedback, the virtual states of input device (105) may be remapped to the corresponding physical states, the haptic feedback can be provided, without using any external physical props. In the case of the first arm (110) and second arm (115), the opening angle of the first arm (110) and second arm (115) may be remapped so that when a user perceives holding an object visually within the virtual environment, the first arm (110) and second arm (115) are touching each other physically, emulating the force feedback as if there is an object between the first arm (110) and second arm (115).

Remapping all the states of the input device (105) is quite different from remapping the spatial location. In an example, the input device (105) is to be at a proper physical state at certain points and the transfer is to be smooth so that it does not break the illusion. In an example, a number of frames may be used in a display device to settle down all the movement of the input device (105) and then fill in in-between frames to finish an animation. In this example, a solution called key state mapping may be used to solve the state mapping problem. In key state mapping, three concepts are defined: state, key state, and transfer state. State is defined by the status of the input device (105) at a precise moment, similar to the idea of a frame in an animation. The state contains both the physical status and what it appears to the user via the display device. Key states are a few states which are used to maintain the haptic illusion and is specified by the input device (105) designer while creating the input device (105). Key states contain description about the input devices' (105) state graphically and physically. Transfer states, similar to in-between frames, are all the other states other than key states. They are generated by interpolating two key states to keep the entire interaction smooth. For example, for the input device (105), three key states can be defined: closed, opened, and holding an object. When the input device (105) is closed or holding an object, the input device (105) should be physically closed to give the appropriate amount of haptic feedback, while when the input device (105) is in an opened state, it should appear to be at the same maximum opening angle. All the other states, the transfer states, can all be defined as between opened and closed or between opened and holding an object.

To generate all the transfer states, a script may be specified to determine which key state transfer that the controller is currently going through and what is the progress of that transfer. With that information, in an example, in each frame, the state transfer of the input device (105) is currently in is identified, the current progress from the physical state the controller is in is calculated and two relevant key states' virtual status by the progress of the transfer as the current transfer state's visual representation is interpolated. For example, whether there is an object between the first arm (110) and second arm (115) of the input device (105) can be a way to determine whether the transfer is currently between holding an object and opened or between closed and opened. Additionally, the physical opening angle as the progress between the transfer may be a determining factor. Then, the visual opening angle between those key states by the current progress as the visual opening angle of this transfer state is interpolated. This can be represented in the following equation:

$$S = \text{Lerp}(K_A, K_B, p^{A \to B}) \quad \text{Eq. 1}$$

where S is the current transfer state; $K_A$ and $K_B$ are indications that the input device (105) is in transition between key state A and key state B; $p^{A \to B}$ is the progress of transition from A to B; and Lerp refers to a linear interpolation function.

In an example, a user may start closing the first arm (110) and second arm (115) of the input device (105) with one object in the middle but end up moving the input device (105) somewhere else to close the first arm (110) and second arm (115) altogether and not grabbing any virtual object. At a certain point, the executed script may determine that the first arm (110) and second arms (115) of the input device (105) are not in the transition between opened and holding an object but instead between opened and fully closed. At this point, the opening angle of the input device (105) will suddenly change, because the executed computer readable program code will start computing the visual opening angle formed by the first arm (110) and second arms (115) using another pair of key states. However, the user may not have changed the physical opening angle of the first arm (110) and second arms (115) at all. This mismatch between physical movement of the first arm (110) and second arms (115) of the input device (105) and the realized virtual movement within the virtual environment may break the haptic illusion presented to the user. In order to solve this, the executed computer readable program code may maintain the visual movement pattern similar to the user's physical movement while keeping the mapping between the visual and physical status of the input device (105) once the input device (105) reaches a key state, Thus, the following equation may be used:

$$S_{i+1} = \begin{cases} Lerp\left(S_i, K_B, \dfrac{p_{i+1}^{A \to B} - p_i^{A-B}}{1 - p_i^{A \to B}}\right) & p_{i+1}^{A \to B} >= p_i^{A \to B} \\ Lerp\left(S_i, K_A, \dfrac{p_i^{A \to B} - p_{i+1}^{A \to B}}{p_i^{A \to B}}\right) & p_{i+1}^{A \to B} < p_{i+1}^{A \to B} \end{cases} \quad \text{Eq. 2}$$

In this example, the state of the last frame is used as a reference. If physically, the user moves towards key state A, then the visual representation will move proportionally to the progress that user has made in this frame divided by the total progress left. According to Eq. 2, if the user maintains a physical angle produced by the first arm (110) and second arms (115) of the input device (105) when an object is between the first arm (110) and second arm (115) or the virtual object moves out of the input device (105) because the progress in the $i^{th}$ and the $i+1^{th}$ frame is the same, the input device (105) will not move, which matches the users expectation. To summarize, with the key state remapping described herein, the interface to implement a new input device (105) using indirect haptic feedback includes providing a few key states, a script to identify the state transfer, and a script for measuring the progress of each transfer. Computer readable program code may be executed in the background to provide for the state remapping. This assures that the transition between states is smooth and also assures that the indirect haptic retargeting process is unnoticeable to the user.

Generally, the enhanced reality system (100) may implement an electronic device. Examples of electronic devices include servers, desktop computers, laptop computers, personal digital assistants (PDAs), mobile devices, smartphones, gaming systems, and tablets, among other electronic devices.

The enhanced reality system (100) may be utilized in any data processing scenario including, stand-alone hardware, mobile applications, through a computing network, or combinations thereof. Further, the enhanced reality system (100) may be used in a computing network, a public cloud network, a private cloud network, a hybrid cloud network, other forms of networks, or combinations thereof. In another example, the methods provided by the enhanced reality system (100) are executed by a local administrator.

To achieve its desired functionality, the enhanced reality system (100) may further include various hardware components. Among these hardware components may be a number of processors, a number of data storage devices, a number of peripheral device adapters, and a number of network adapters. These hardware components may be interconnected through the use of a number of busses and/or network connections. In one example, the processor, data storage device, peripheral device adapters, and a network adapter may be communicatively coupled via a bus.

The processor may include the hardware architecture to retrieve executable code from the data storage device and execute the executable code. The executable code may, when executed by the processor, cause the processor to implement at least the functionality of simulating the touching of ends of the first arm (110) and/or second arms (115) as touching at least two positions on outer surfaces of a virtual object presented in the enhanced reality environment according to the methods of the present specification described herein. In the course of executing code, the processor may receive input from and provide output to a number of the remaining hardware units.

The data storage device may store data such as executable program code that is executed by the processor or other processing device. As will be discussed, the data storage device may specifically store computer code representing a number of applications that the processor executes to implement at least the functionality described herein.

The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processor may boot from Read Only Memory (ROM), maintain nonvolatile storage in the Hard Disk Drive (HDD) memory, and execute program code stored in Random Access Memory (RAM).

Generally, the data storage device may include a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters in the enhanced reality system (100) enable the processor to interface with various other hardware elements, external and internal to the enhanced reality system (100) including the input device (105). For example, the peripheral device adapters may provide an interface to input/output devices, such as, for example, the input device (105), a display device, a mouse, or a keyboard. The peripheral device adapters may also provide access to other external devices such as an external storage device, a number of network devices such as, for example, servers, switches, and routers, client devices, other types of computing devices, and combinations thereof.

The display device may be provided to allow a user of the enhanced reality system (100) to interact with and implement the functionality of the enhanced reality system (100) as described herein. Specifically, the display device may provide to a user a visual rendering of a virtual environment. The peripheral device adapters may also create an interface between the processor and the display device, a printer, or other media output devices. The network adapter may provide an interface to other computing devices within, for example, a network, thereby enabling the transmission of data between the enhanced reality system (100) and other devices located within the network.

The enhanced reality system (100) may, when executed by the processor, display the number of graphical user interfaces (GUIs) on the display device associated with the executable program code representing the number of applications stored on the data storage device, Additionally, via making a number of interactive gestures on the GUIs of the display device via the input device (105), a user may interact with any number of virtual objects represented in the virtual environment. Examples of display devices include a computer screen, a laptop screen, a mobile device screen, a personal digital assistant (FDA) screen, and a tablet screen, a virtual reality headset, augmented reality glasses, any enhanced reality display device, among other display devices.

The enhanced reality system (100) further includes a number of modules used in the implementation of the haptic retargeting process or ungrounded haptic retargeting process as described herein. The various modules within the enhanced reality system (100) include executable program code that may be executed separately. In this example, the various modules may be stored as separate computer program products. In another example, the various modules within the enhanced reality system (100) may be combined within a number of computer program products; each computer program product comprising a number of the modules.

Figure 2:
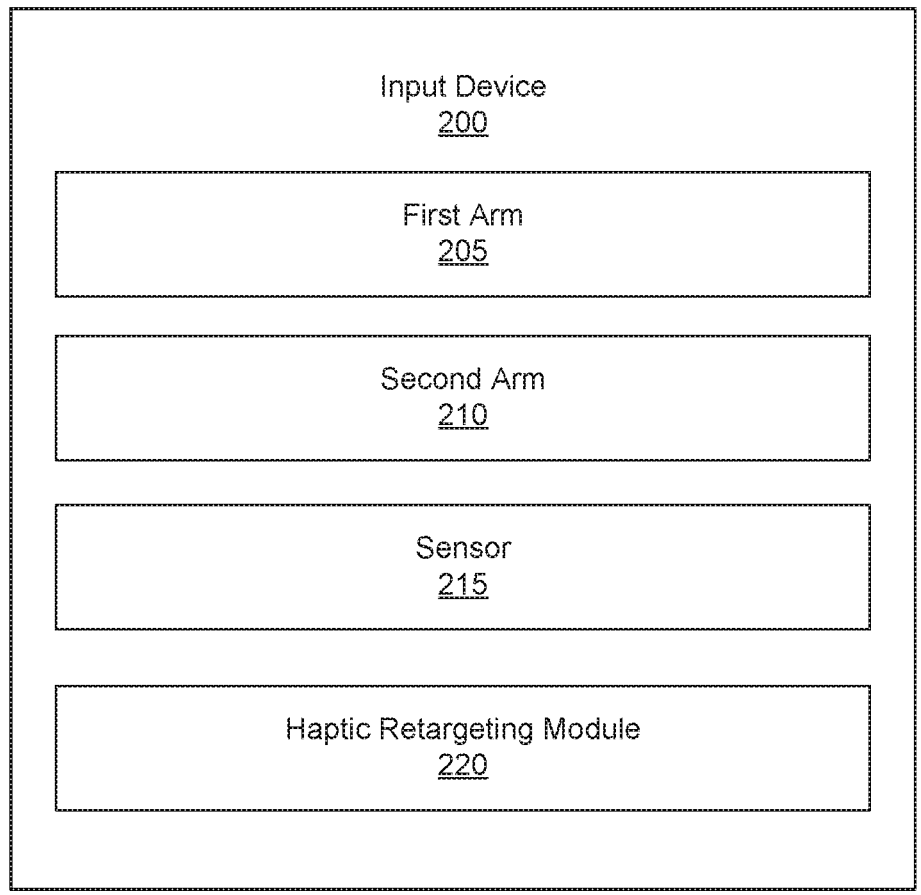
FIG. 2 is a block diagram of an input device according to an example of the principles described herein.

FIG. 2 is a block diagram of an input device (200) according to an example of the principles described herein. The input device (200) may include a first arm (205), a second arm (210), a sensor (215) and a haptic retargeting module (220).

As described herein, the first arm (205) and second arm (210) may take the form of elongated members similar to those seen with a pair of chopsticks. In some examples, the first arm (205) and second arm (210) may be coupled together at a proximal end using a hinging device. A sensor (215) may be coupled to the hinge in order to determine the relative position of, at least, the distal ends of the first arm (205) and second arm (210) and thereby to determine the relative distance between, at least the distal ends of the first arm (205) and second arm (210). The sensor (215) may be a potentiometer, optical encoder, camera, compression sensor, Hall effect sensor, or rotational position encoder. This information may be provided to a processor associated with the input device (105) in order to calculate the distance between the distal ends of a virtual pair of first arm (205) and second arm (210) in a virtual environment according the to the processes and methods described herein.

The sensor (215) may further include a number of devices that can determine the 3D real-world position and orientation of the first arm (205) and second arm (210) of the input device (105) as well as the relative position of the first arm (205) and second arm (210) with respect to each other. In some examples, multiple tracking devices may be used and signals originating from these tracking systems (120) and devices may be used individually or in combination to determine the real-world 3D position of the first arm (205) and second arm (210).

In an example, the sensor (215) may include a camera on one arm viewing fiduciary marks on the other arm, or a Hall effect sensor on one arm measuring proximity to a magnet on the other arm, or a light and light sensor on one arm measuring the light reflected from the second arm.

In an example, the sensor (215) may include a coupleable tracking device. In this example, the coupleable tracking device may include sensors similar to those used to track the position of other components in the ER system (e.g. hand controllers), which are used to detect the position of the first arm (205) and/or second arm (210) and the input device (200) generally based on the positional relationship of the coupleable tracking device to the first arm (205) and second arm (210) and/or input device (200).

The input device (200) may further include a haptic retargeting module (220). The haptic retargeting module (220) may implement the haptic retargeting process or ungrounded haptic retargeting process as described herein. In an example, the haptic retargeting module (220) may include computer readable program code to, when executed by a processor associated with the input device (200), simulate the touching of ends of the first arm (205) and/or second arms (210) as touching at least two positions on outer surfaces of a virtual object presented in the enhanced reality environment. The processor may, in an example, take advantage of equations 1 and 2 described herein in order to present to a user the feel that physical operation of the input device (200) results in virtual interfacing with a virtual object presented to the user in a virtual environment.

Figure 3:
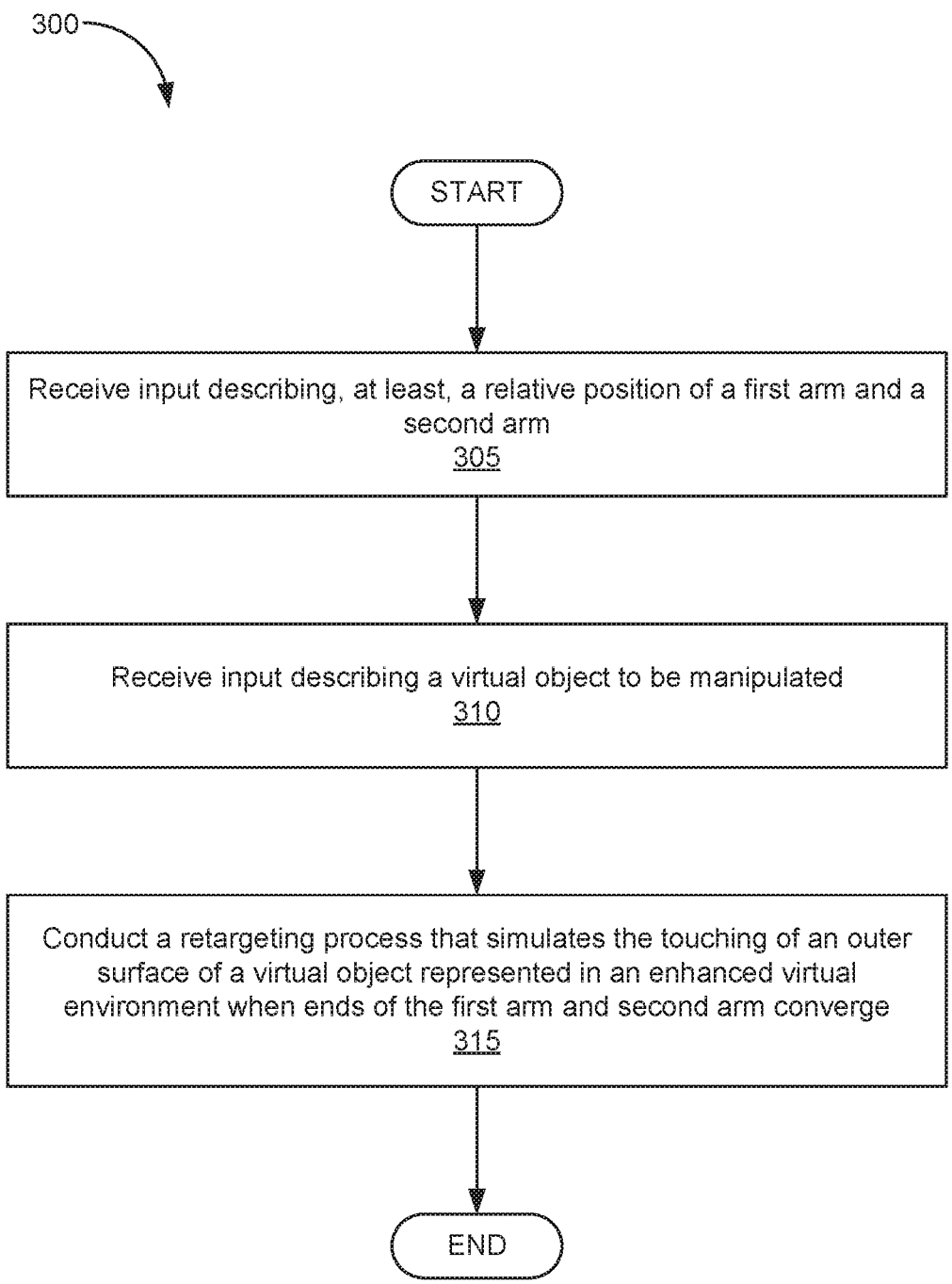
FIG. 3 is a flowchart showing a method of mapping physical 3D space with virtual 3D space according to an example of the principles described herein.

FIG. 3 is a flowchart showing a method (300) of mapping physical 3D space with virtual 3D space according to an example of the principles described herein. The method (300) may begin with receiving (305) input from sensor (120) describing, at least, a distance between the distal ends a first arm and a second arm.

The method (300) may continue with receiving (310) input describing a virtual object to be manipulated. In an example, the enhanced reality system (100) includes a screen a user may view while manipulating virtual objects represented in a virtual environment presented thereon. enhanced reality system (100) may, via indication by a user implementing the input device (105), select a specific virtual object to manipulate. The selection process may include the use of a number of threshold distances as described herein in order to select the virtual object. The selection of the virtual object is then received by a processor associated with the enhanced reality system (100).

The method (300) may continue with conducting (315) a retargeting process that simulates the touching of an outer surface of a virtual object represented in an enhanced virtual environment when ends of the first arm (110) and second arm (115) converge. The retargeting process may include some or all of the features of the haptic retargeting process or ungrounded haptic retargeting process as described herein. In an example, the processor associate with the input device (105) may conduct the haptic retargeting process or ungrounded haptic retargeting process as described herein. In an example, the processor associated with the enhanced reality system (100) generally may conduct the haptic retargeting process or ungrounded haptic retargeting process as described herein.

Figure 4:
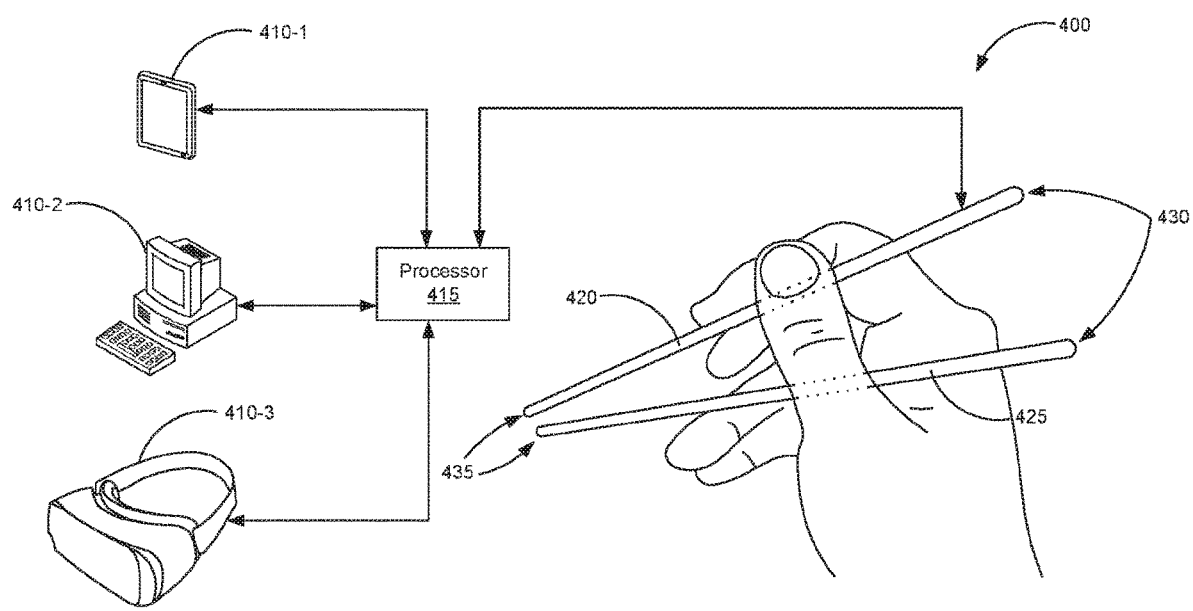
FIG. 4 is a diagram of an enhanced reality system according to an example of the principles described herein.

FIG. 4 is a diagram of an enhanced reality system (400) according to an example of the principles described herein. The enhanced reality system (400) may include an input device (405) to be used by the user of the enhanced reality system (400), and at least one visual output device (410-1, 410-2, 410-3), and a processor (415) associated with both the input device (405) and the visual output device (410-1, 410-2, 410-3).

As described herein, the input device (405) may include a first arm (420) and a second arm (425) made in the form of a pair of chopsticks. Accordingly, in this example, the first arm (420) and second arm (425) may be held in a user's hand similarly to how a user would hold a pair of chopsticks. In other examples, the first arm (420) and second arm (425)

may include a hinge at a proximal end (430) of the first arm (420) and second arm (425) opposite a distal end (435) of the first arm (420) and second arm (425).

In some examples, the user may move the first arm (420) relative to the second arm (425), the second arm (425) relative to the first arm (420), and/or move both the first arm (420) and second arm (425) relatively to each other in order to interface, virtually, with a virtual object presented to a user via the visual output device (410-1, 410-2, 410-3).

As described herein, the visual output device (410-1, 410-2, 410-3) may be any type of visual output device that can render visually, to a user, a virtual environment. Consequently, the visual output device (410-1, 410-2, 410-3) of the enhanced reality system (400) may be a tablet device (410-1), a desktop computing device (410-2), and/or a virtual headset device (410-3), among others. Although three examples of visual output devices (410-1, 410-2, 410-3) have been shown in connection with FIG. 4, any additional type or number of visual output devices (410-1, 410-2, 410-3) may be used during operation of the present enhanced reality system (400) and the present specification contemplates such use.

Figure 5A:
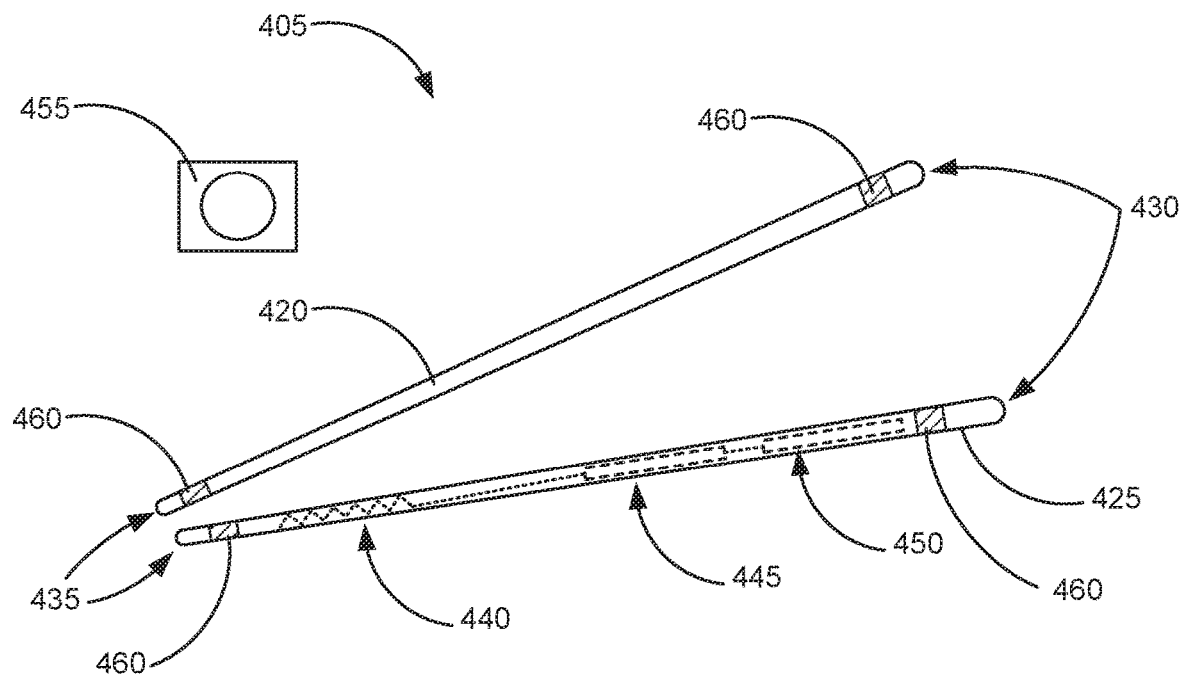
FIG. 5A is a diagram show an input device according to an example of the principles described herein.
Figure 5B:
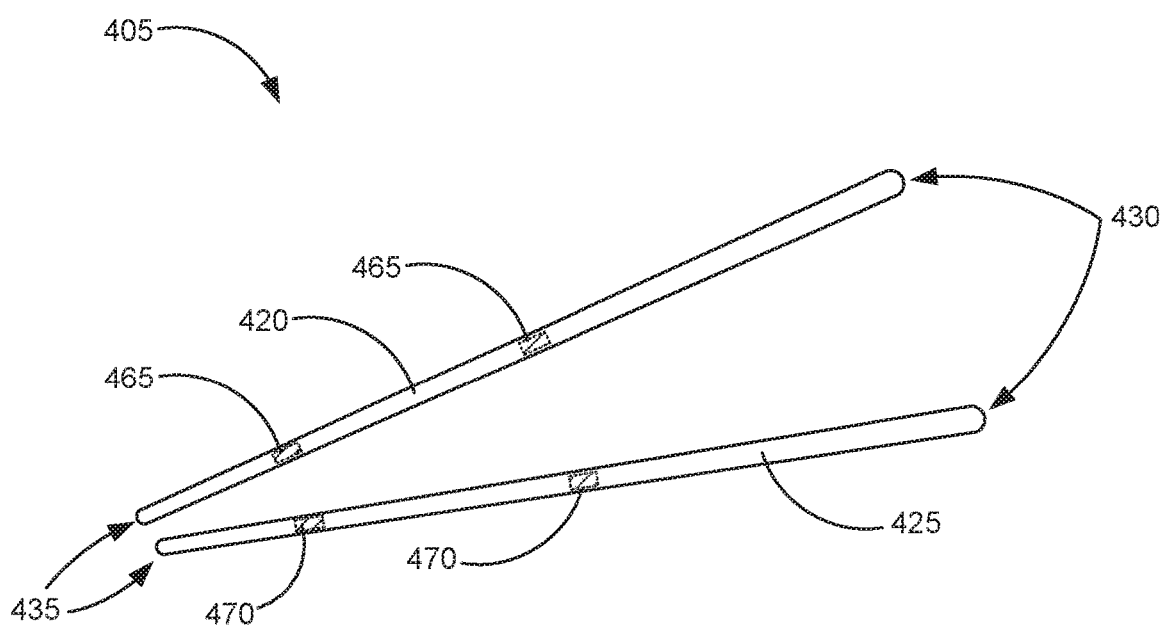
FIG. 5B is a diagram show an input device according to an example of the principles described herein.

In some examples, in order to provide haptic feedback to a user, the first arm (420) and second arm (425) of the input device (405) may include additional elements. FIGS. 5A, 5B, and 5F show a number of devices that may be used to track the position and/or orientation, determine a relative distance between, and/or detect contact between the first arm (420) and second arm (425). Additionally, 5C-5E show a number of elements that may be used during operation of the input device (405). In some examples, these devices provide haptic feedback to a user and/or additional functionality to the input device (405). It should be noted that the additional elements shown and described in connection with FIGS. 5A-5F may be used individually or in any combination.

FIG. 5A is a diagram show an input device (405) according to an example of the principles described herein. In this example, the input device (405) includes a strain gauge (440), a wireless link (445), and a battery (450). In an example, the input device (405) may be monitored by a camera (455) that tracks a number of markers (460) placed on at least one of the first arm (420) and second arm (425) of the input device (405).

The strain gauge may detect bending forces placed on at least one of the first arm (420) and/or second arm (425) and may be incorporated into either or both of the first arm (420) and second arm (425). Signals from the strain gauge (440) may be sent to a wireless link (445) that may wirelessly send the signal the processor (415) associated with the enhanced reality system (400) as described herein. The strain gauge (440) may be powered by the battery (450).

FIG. 5B is a diagram show an input device (405) according to an example of the principles described herein. In the example shown in FIG. 5B, the input device (405) may include a number of magnets (465) and a number of Hall effect sensors (470). The number of magnets (465) and the number of Hall effect sensors (470) may be included within one or both of the first arm (420) and second arm (425). As described herein, the Hall effect sensors (470) may sense the presence of the magnets (465) and provide a signal representative of the relative distance of the first arm (420) to the second arm (425), The signals may be processed by the processor (415) associated with the enhanced reality system (400) as described herein.

Figure 5C:
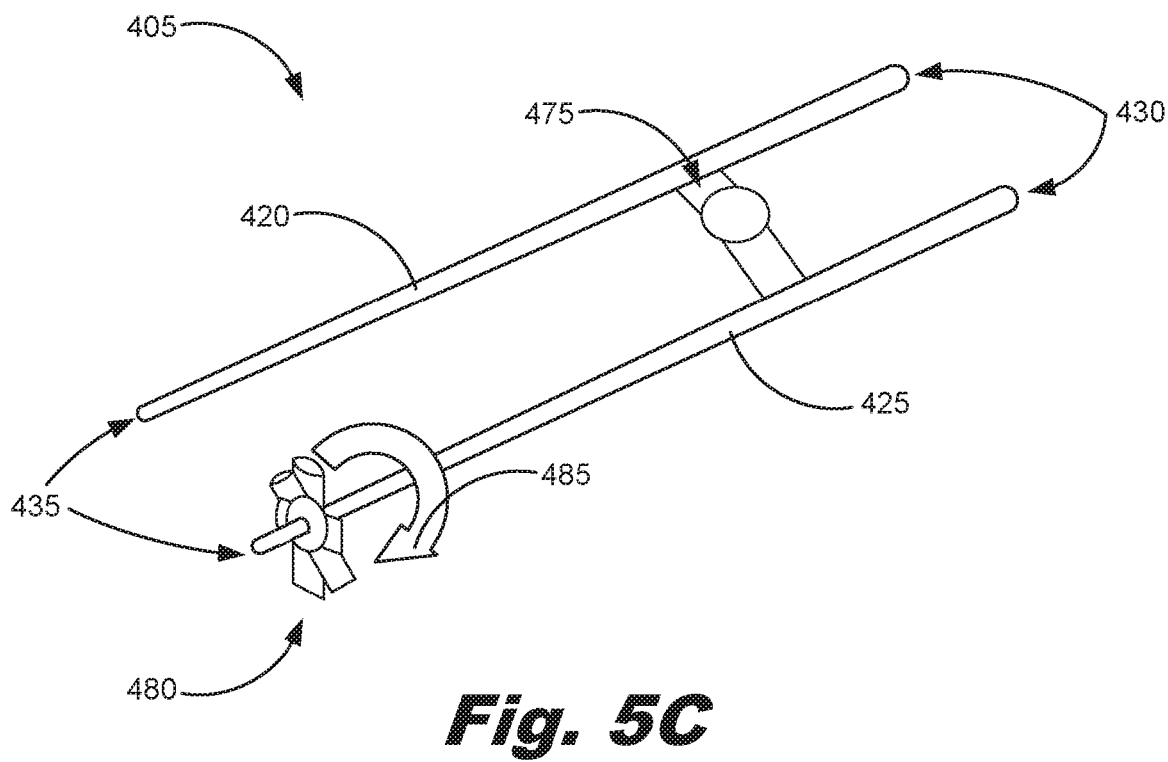
FIG. 5C is a diagram show an input device according to an example of the principles described herein.

FIG. 5C is a diagram show an input device (405) according to an example of the principles described herein. FIG. 5C shows an example of the geometry of the first arm (420) and second arm (425) being changed during use. As described herein, any number of devices may be used to change the physical geometry of at least one of the first arm (420) and second arm (425) in discrete steps in order to provide some level of haptic feedback to the user as well as provide haptic feedback to the user as the haptic retargeting process is initiated, thus, the present specification contemplates the combination of these haptic feedback devices as well as other devices used to give a user the sense of actually manipulating a virtual object of with the input device (405). These devices further allow a user to manipulated any arbitrary sized virtual object using the input device (405). As an example, the geometry of the first arm (420) and second arm (425) may be changed to create a space between the first arm (420) and second arm (425) that is more or less than the size of the virtual object. In this case, the haptic retargeting process described herein may accommodate the differences in sizes in the real world versus the virtual world. In these examples, any passive or active devices used to alter the geometry of the first arm (420) and second arm (425) may be used.

The input device (405) in the example shown in FIG. 5C includes a hinge (475) and a number of intervening stopping members (480). The hinge (475) may couple the first arm (420) and second arm (425) together at a point. In an example, the hinge (475) couples the first arm (420) and second arm (425) at a location closer to the proximal end (430) of each of the first arm (420) and second arm (425) than the distal end (435) of the first arm (420) and second arm (425). The hinge constrains the motion of the arms so that they close on the selected stopping member. The hinge (475) may also provide ease of use by a user who may not know or is incapable of operating the input device (405) should the hinge (475) not be present. The hinge (475) may also prevent the physical separation of the first arm (420) and second arm (425) so that one of the first arm (420) and second arms (425) is not lost. The hinge (475) may also form a conduit through which an electrical connection can be formed thereby providing signals and/or power between both the first arm (420) and second arm (425).

The intervening stopping members (480) may be formed about a longitudinal axis of at least one of the first arm (420) and second arm (425). As discussed herein, the number intervening stopping members (480) may be fixed to a distal end of at least one of the first arm (420) and second arm (425). As the user interacts with a virtual object in a virtual environment, the intervening stopping members (480) may be placed in between the first arm (420) and second arm (425) in order to simulate the grasping of the virtual object by the first arm (420) and second arm (425) by placing a stopping force between the first arm (420) and second arm (425). In an example, the intervening stopping members (480) may be coupled to one or both of the first arm (420) and second arm (425) such that rotation about one of the first arm (420) and second arm (425) may selectively place at least one of the number of physical intervening stopping members in between the first arm (420) and second arm (425). In some examples, the length and compliance of each of the number of physical intervening stopping members may be selected based on the type of virtual object selected by the user. In some examples, the stopping members on one arm may differ in length, while the stopping members on the other arm differ in compliance. As an example, a virtual object to be selected by the user is small. In this example, the enhanced reality system (400) detects that a user is going to select that object and causes one of the intervening stopping members (480) to be placed between the first arm (420) and second arms (425). Since the virtual object is small, the selected physical intervening stopping member is short, such that a user interfacing with the virtual object feels that contact has been accomplished more or less as the selected interleaving stopping member prevents the first arm (420) and second arms (425) from touching.

Additionally, the material properties of at least one arm may be used to imitate the physical characteristics of the virtual object. Softer surfaces, springs, magnets, electromagnets, inflatable bladders, and similar devices may be used to alter the compliance. In an example, the selected intervening stopping members (480) may be relatively more or less compliant in order to provide haptic feedback to a user that the virtual object is relatively more or less compliant. In these examples, the user, via the input device (405), is lead to believe that the properties of the virtual object can actually be felt. This leads to a relatively better experience with the enhanced reality system (405).

In an example, a particular intervening stopping members (480) may be selected and placed in between the first arm (420) and second arm (425) using a motor to rotate the set of intervening stopping members (480). The motor may rotate the intervening stopping members (480) in the direction of the arrow (485). In an example, the interleaving stopping member (480) may have a spiral shape such that the stopping distance between the first arm (420) and second arm (425) may be set based on the thickness of the spiral interposed between the first arm (420) and second arm (425).

Figure 5D:
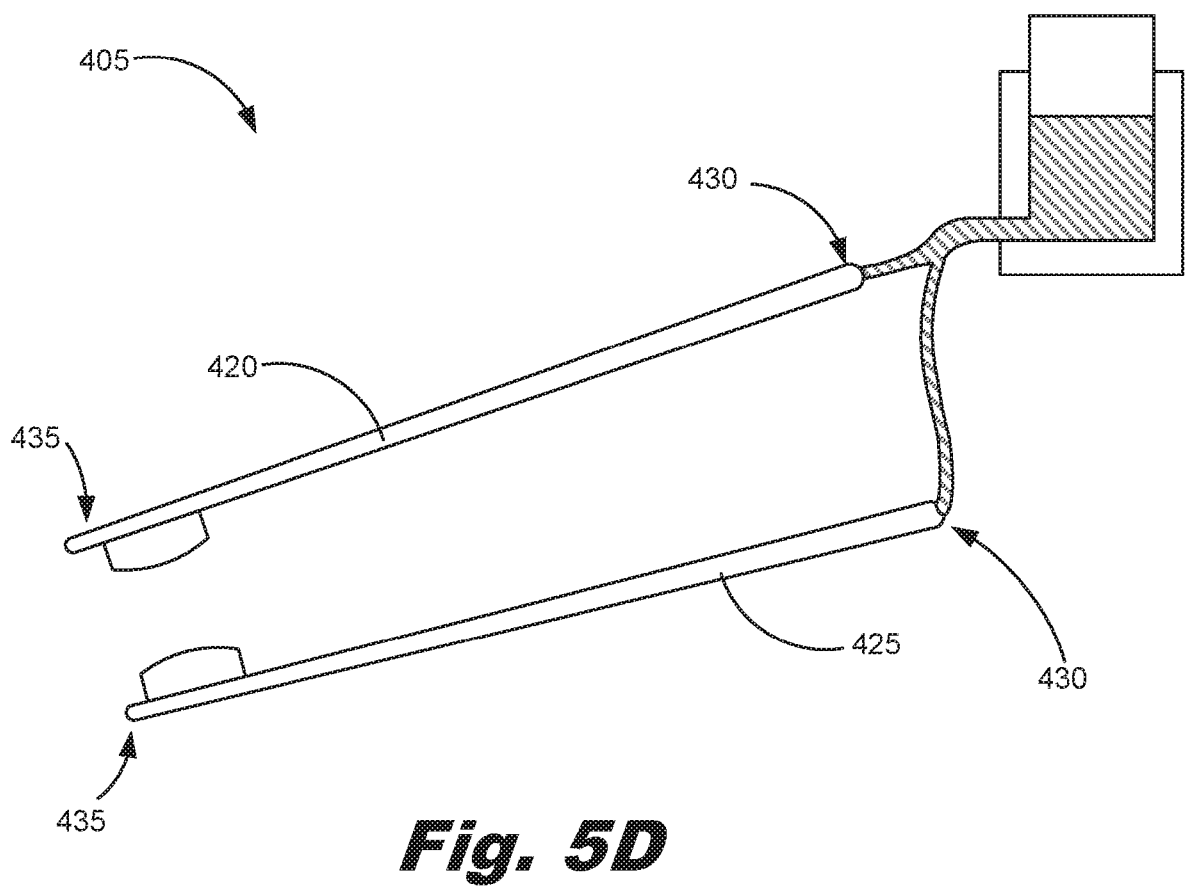
FIG. 5D is a diagram show an input device according to an example of the principles described herein.

FIG. 5D is a diagram show an input device (405) according to an example of the principles described herein. In the example shown in FIG. 5D, the input device (405) includes a number of inflatable bags (485). The inflatable bags (485) may serve to also mimic the feel of grasping a virtual object by selectively increasing the weight at the distal end of the first arm (420) and second arm (425). As shown, the inflatable bags (485) may be fluidically coupled to a fluid reservoir (488) via a number of hoses extending along or within the first arm (420) and second arm (425). The inflatable bags may be inflate using fluids such that the weight of a virtual object may be mimicked. As the first arm (420) and second arms (425) are raised, the inflatable bags (485) are filled with fluid to mimic in real life the weight of the virtual object.

Figure 5E:
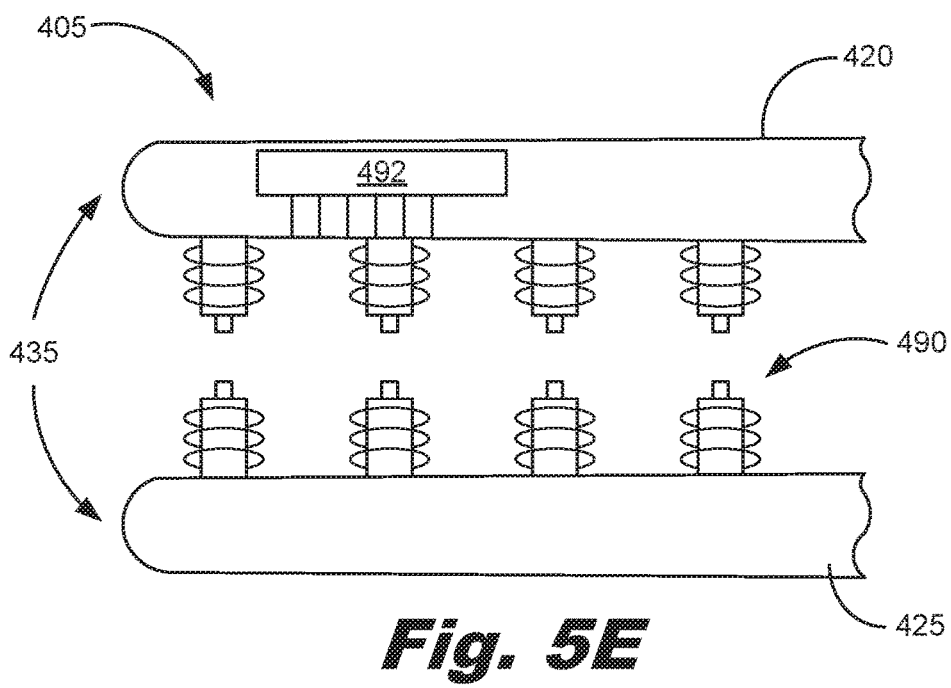
FIG. 5E is a diagram show an portion of an input device according to an example of the principles described herein.
Figure 5F:
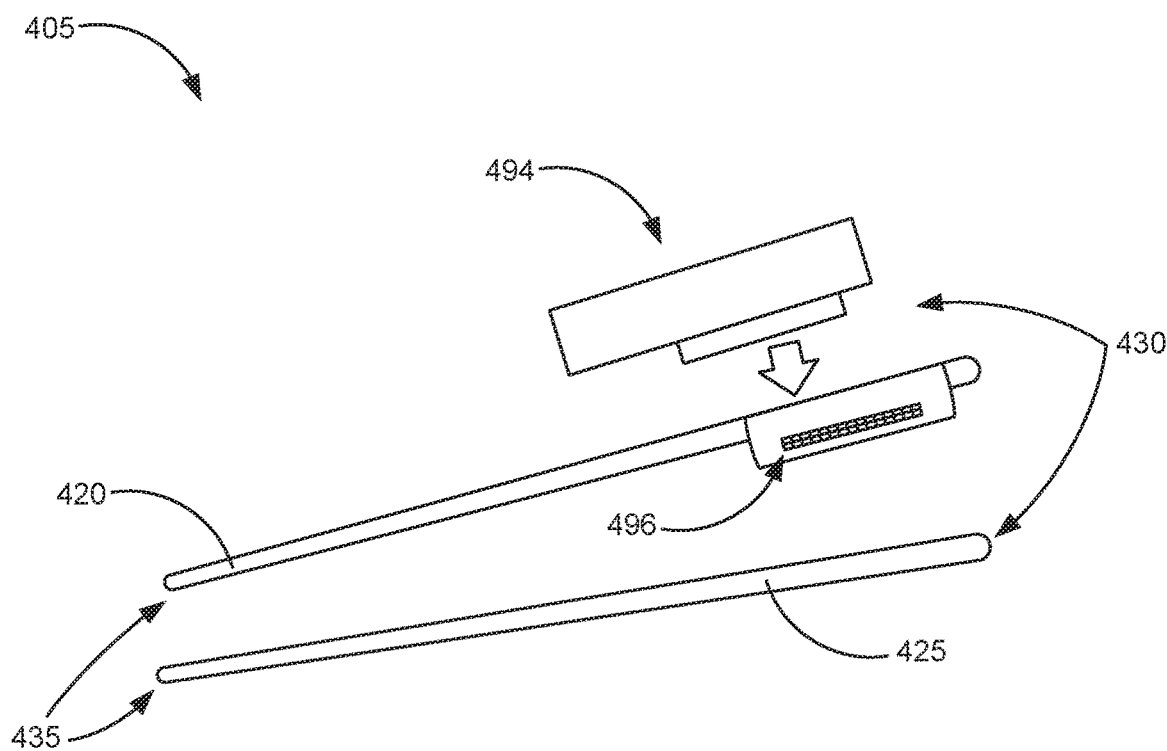
FIG. 5F is a diagram show an input device according to an example of the principles described herein.

FIG. 5E is a diagram show a portion of an input device according to an example of the principles described herein. The portion of the input device (405) shown is the distal end (435) of the first arm (420) and second arm (425). In this example, a number of electromagnets (490) have been formed into the surface of the distal ends (435) of the first arm (420) and second arm (425). These electromagnets (490) may be used to mimic the surface permeability of a virtual object by adjusting the repelling and/or attracting forces produced by the electromagnets (490). Any number of electromagnets (490) may be formed into the distal ends (435) of the first arm (420) and second arm (425) and the battery (450) may provide the electrical source for the electromagnets (490). A control circuit (492) may also be electrically coupled to the electromagnets (490) to control the magnetic force produced by each of the electromagnets (490). A force feedback device such as the strain gauge (440) may also be coupled to the control circuit (492) in order to determine the strain or force produced by the electromagnets (490) against the first arm (420) and second arm (425). Thus, a user may experience in the real world a perceived hardness or softness of a virtual object represented in the virtual environment.

FIG. 5F is a diagram show an input device (405) according to an example of the principles described herein. In this example, the input device (405) may include a coupleable tracking device (494) and an electrical interconnect (496) that couples the coupleable tracking device (494) to the first arm (420) and second arm (425). In this example, the coupleable tracking device (494) may include its own sensors that can detect the 3D position of the coupleable tracking device (494) and, in turn, the 3D position of the first arm (420) and second arm (425). With this information, the coupleable tracking device (494) may send, wirelessly or wired, information to the processor (415) indicating the 3D position of the first arm (420) and/or second arm (425). The electrical interconnect (496) coupling the coupleable tracking device (494) to the first arm (420) and second arm (425) may provide additional information to the coupleable tracking device (494) originating from the sensors coupled to the first arm (420) and second arm (425). As an example, the Hall effect sensors (470) and/or strain gauge (440) may provide their respective signals to the coupleable tracking device (494) via the electrical interface. The coupleable tracking device (494), in an example, may include a processor (415) to process any data received from the first arm (420) and second arm (425) and communicate that information to another processor (415) associated with the display (410-1, 410-2, 410-3) of an enhanced reality system (400). In this manner, the physical orientation of, at least, the first arm (420) and second arm (425) may be translated into a virtual environment.

Figure 6:
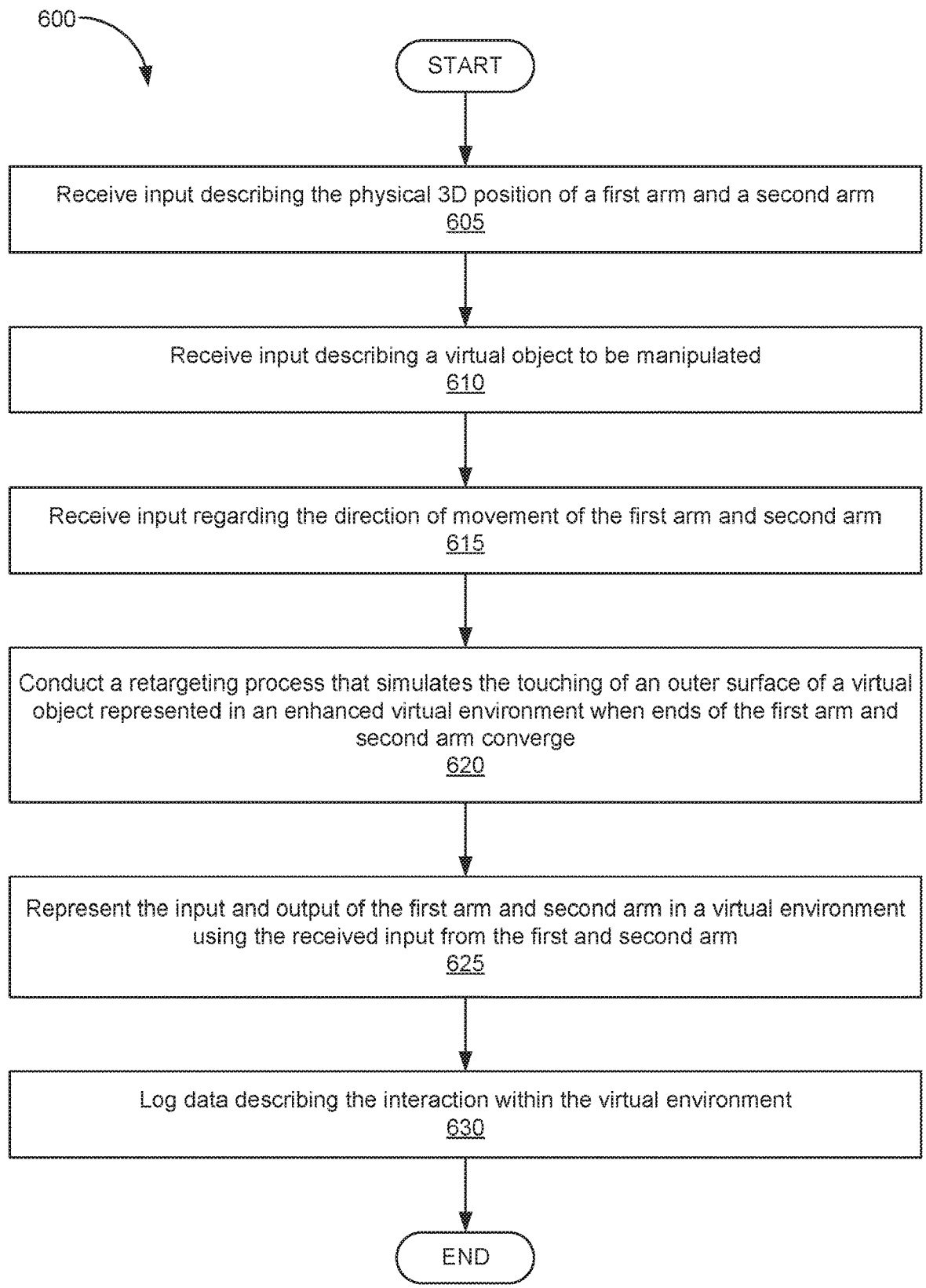
FIG. 6 is a flowchart showing a method of mapping physical 3D space with virtual 3D space according to an example of the principles described herein.

FIG. 6 is a flowchart showing a method (600) of mapping physical 3D space with virtual 3D space according to an example of the principles described herein. The method (600) may begin with receiving (605) input describing the physical 3D position of a first arm (420) and second arm (425). The method (600) continues with receiving (310) input describing the virtual object to be manipulated. The method (600) may then proceed with receiving input regarding the direction of movement of the first arm (420) and second arm (425). Further, the method (600) proceeds with conducting (620) a retargeting process that simulates the touching of an outer surface of a virtual object represented in an enhanced virtual environment when distal end (435) of the first arm (420) and second arm (425) converge. The method (600) then includes representing (625) the input and output of the first arm (420) and second arm (425) in a virtual environment using the received input from the first arm (420) and second arm (425). The method may further include logging (630) data describing the interaction within the virtual environment.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (415) of the enhanced reality system (400) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe an enhanced reality system that implements a haptic retargeting process in order to mimic the interfacing and manipulation of a virtual object represented in a virtual environment. The system further includes a number of sensors and other devices that provide feedback describing, among other characteristics, the 3D position of the first and second arm of the input device, the strain placed on either of the first and second arm.

The preceding description has been presented to illustrate and describe examples of the principles described. This description is not intended to be exhaustive or to limit these principles to any precise form disclosed. Many modifications and variations are possible in light of the above teaching.

What is claimed is:

1. An enhanced reality system, comprising:
   an input device formed as chopsticks or tongs, the input device comprising a first arm and a second arm to be held together in a hand of a user, each arm comprising an elongated rigid member, the two arms manipulable with respect to each other by the user's hand;
   a sensor to sense, at least, a relative position of at least a portion of the first and second arms;
   wherein sensing, at least, the relative position of the first and second arms comprises a haptic retargeting process that simulates a touching of ends of the first and second arms to the outer surface of a virtual object presented in the enhanced reality environment;
   wherein converging movement of the first and second arms during the haptic retargeting process is translated into slower converging movement of a pair of virtual arms represented in the enhanced reality environment.

2. The enhanced reality system of claim 1, further comprising a tracking system to track a three-dimensional (3D) position of the first and second arms and wherein the tracking system detects selection of the virtual object before conducting the haptic retargeting process.

3. The enhanced reality system of claim 1, wherein the sensor comprises a camera to detect, at least, a 3D position of the first and second arms.

4. The enhanced reality system of claim 1, further comprising a haptic feedback device connected to the first and second arms to simulate contact with the virtual object by the first arm and the second arm.

5. The enhanced reality system of claim 1, wherein the sensor measures the rotation of a joint connecting the first and second arms.

6. The enhanced reality system of claim 1, further comprising an object tracker physically coupled to the first and second arms that detects the position and orientation of each of the first and second arms within a 3D physical space and the position of the first and second arms relative to each other.

7. An input device, comprising:
   a hand-held member in the form of chopsticks or tongs, the hand-held member comprising
   a first arm, and
   a second arm, each arm comprising an elongated rigid member manipulable with respect to the other arm by a user's hand;
   a sensor to detect the relative position of the first arm and second arm; and
   an intervening stopping member disposed between ends of the first and second arms to resist movement of the ends of the first and second arms toward each other to simulate contact with a virtual object by the first and second arms when operated by a user's hand; wherein a convergence rate of a virtual representation of the first arm and a virtual representation of the second arm represented in an enhanced virtual environment is relatively slower than a convergence rate of the physical first arm and second arm, respectively.

8. The input device of claim 7, wherein the sensor comprises a camera to detect, at least, the relative position of the first and second arms.

9. The input device of claim 8, wherein the haptic retargeting module reconfigures a physical position of the first arm and second arm to retarget a virtual position of the virtual first arm and virtual second arm for an arbitrarily sized virtual object.

10. The input device of claim 7, further comprising a haptic retargeting module to reconfigure the physical position of the first arm and second arm to a virtual position of a virtual first arm and virtual second arm in an enhanced virtual environment, respectively, such that haptic feedback provided to a user by the first and second arms translates into virtual touching of the ends of the virtual first arm and virtual second arm to a first surface point and second surface point, respectively, on a virtual object represented in the enhanced virtual environment.

11. The input device of claim 7, wherein the intervening stopping member comprises a plurality of intervening stopping members that rotate about at least one of the first and second arms and wherein each of the plurality of intervening stopping members have distinct lengths and compliance properties.

12. The input device of claim 7, wherein a geometry of at least one of the first and second arms may be altered based on a physical space of a haptic feedback devices placed between the first arm and second arm.

13. The input device of claim 7, wherein the hand-held member is in the form of chopsticks with no physical attachment connected between the first and second arms.

14. A computer program product for mapping physical 3D space with virtual 3D space, the computer program product comprising:
   a non-transitory computer readable storage medium comprising computer usable program code embodied therewith, the computer usable program code to, when executed by a processor:
   receive input describing, at least, a relative position of a first arm and a second arm, each arm comprising an elongated member manipulable with respect to the other arm by a user's hand;
   receive input describing a virtual object to be manipulated by the user operating the first and second arms; and
   conduct a retargeting process that operates a haptic feedback device connected to the first and second arms that simulates touching of an outer surface of the virtual object represented in an enhanced virtual environment when ends of the first arm and second arm converge;
   wherein a convergence rate of a virtual representation of the first arm and a virtual representation of the second arm represented in the enhanced virtual environment is relatively slower than a convergence rate of the physical first arm and second arm, respectively, during the retargeting process.

15. The enhanced reality system of claim 1, wherein the first and second arms are attached to each other by a tether or hinge.

16. The enhanced reality system of claim 4, wherein the haptic feedback device comprises a stopping member disposed between opposing ends of the first and second arms.

17. The enhanced reality system of claim 16, wherein the stopping member comprises an inflatable bag connected to a fluid delivery system to selectively inflate the inflatable bag.

18. The enhanced reality system of claim 16, wherein the stopping member comprises electromagnets.

19. The enhanced reality system of claim 16, wherein the stopping member comprises a number of different members of different length and compliance that are arranged in a circle around an end of one of the arms, the stopping member rotatable to bring a selected member into a position between the ends of the first and second arms.

* * * * *